(12) United States Patent
Stein et al.

(10) Patent No.: US 10,294,641 B2
(45) Date of Patent: May 21, 2019

(54) FLOW RATE REGULATOR

(75) Inventors: Alexander Stein, Ihringen (DE);
Christoph Taran, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 453 days.

(21) Appl. No.: 13/702,198

(22) PCT Filed: Mar. 30, 2011

(86) PCT No.: PCT/EP2011/001581
§ 371 (c)(1),
(2), (4) Date: Dec. 5, 2012

(87) PCT Pub. No.: WO2011/154066
PCT Pub. Date: Dec. 15, 2011

(65) Prior Publication Data
US 2013/0082121 A1 Apr. 4, 2013

(30) Foreign Application Priority Data

Jun. 11, 2010 (DE) .................... 20 2010 007 835 U

(51) Int. Cl.
*G05D 7/01* (2006.01)
*E03C 1/08* (2006.01)

(52) U.S. Cl.
CPC ............... *E03C 1/08* (2013.01); *G05D 7/012* (2013.01)

(58) Field of Classification Search
CPC ............ E03C 1/08; E03C 1/084; E03C 1/086; G05D 7/012

(Continued)

(56) References Cited

U.S. PATENT DOCUMENTS 4,562,960 A 1/1986 Marty et al.
7,374,366 B2 * 5/2008 Tasi ........................ E03C 1/084
210/456

(Continued)

FOREIGN PATENT DOCUMENTS

DE 8202024 6/1982
DE 19510734 9/1996
(Continued)

*Primary Examiner* — Jason J Boeckmann
(74) *Attorney, Agent, or Firm* — Volpe and Koenig, P.C.

(57) ABSTRACT

A flow rate regulator (1) having a regulator housing (2), wherein said regulator housing (2) has an outer circumferential edge region (5) that can be placed on an end circumferential edge region (3) of a jet regulator (6) and/or of a sieve (11) and including a central annular gap (12), in which an annular throttle body (13) made of elastic material is present, bounding a control gap (15) between same and an inner and/or outer circumferential wall (14) of the annular gap (12) having a control profile, wherein the open flow-through cross-section of said control gap is changeable under the pressure of the flowing water. The flow rate regulator (1) according to the invention is characterized in that said regulator has a shell-shaped regulator housing (2), the outer circumferential edge region (5) of which is designed as a radially outwardly protruding ring flange, and in that the inner shell chamber (18) of the regulator housing (2) open to the outlet side is dimensioned for receiving a sub-region of the sieve (11) protruding past the end circumferential edge region (3) of the jet regulator (6).

8 Claims, 2 Drawing Sheets

(58) Field of Classification Search
USPC .................................................. 239/428.5
See application file for complete search history.

(56) References Cited

U.S. PATENT DOCUMENTS

| | | | |
|---|---|---|---|
| 2006/0144962 A1* | 7/2006 | Zoller ........................ | 239/428.5 |
| 2009/0008478 A1* | 1/2009 | Grether .................. | B01D 35/04 |
| | | | 239/428.5 |
| 2010/0065661 A1* | 3/2010 | Grether et al. ............ | 239/428.5 |
| 2010/0147397 A1* | 6/2010 | Zoller .................... | G05D 7/012 |
| | | | 137/115.13 |
| 2010/0163478 A1* | 7/2010 | Yuan ............................ | 210/251 |

FOREIGN PATENT DOCUMENTS

| | | |
|---|---|---|
| DE | 202007008809 | 10/2007 |
| DE | 202008017031 | 6/2010 |
| EP | 0733748 | 9/1996 |
| EP | 1933217 | 6/2008 |

\* cited by examiner

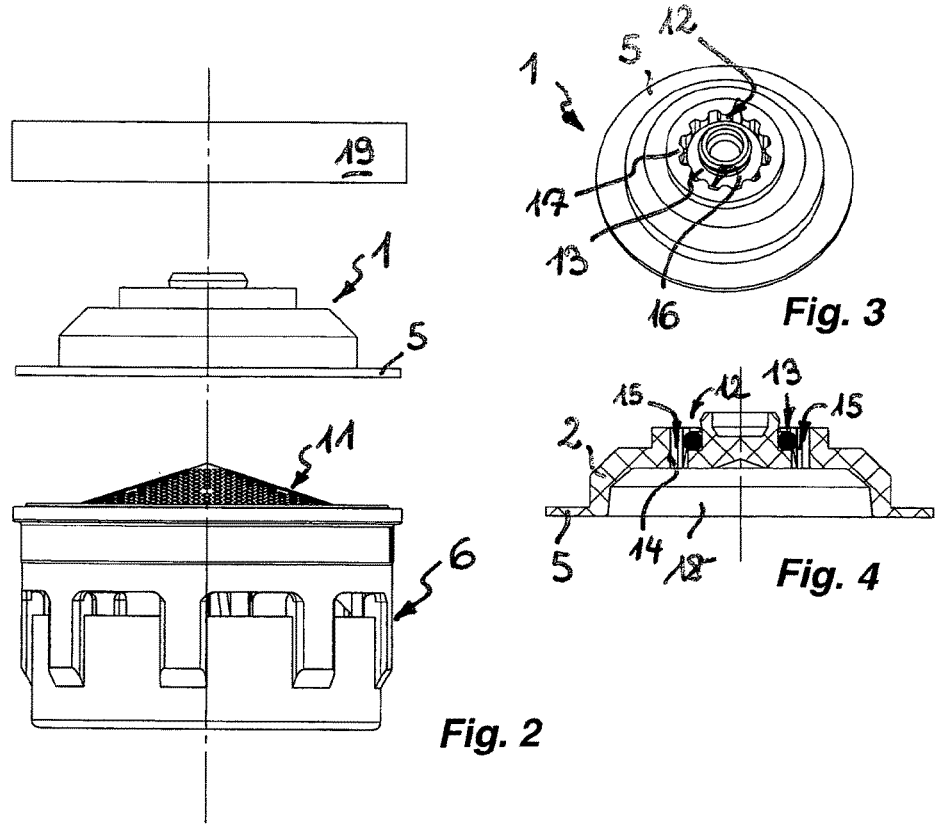
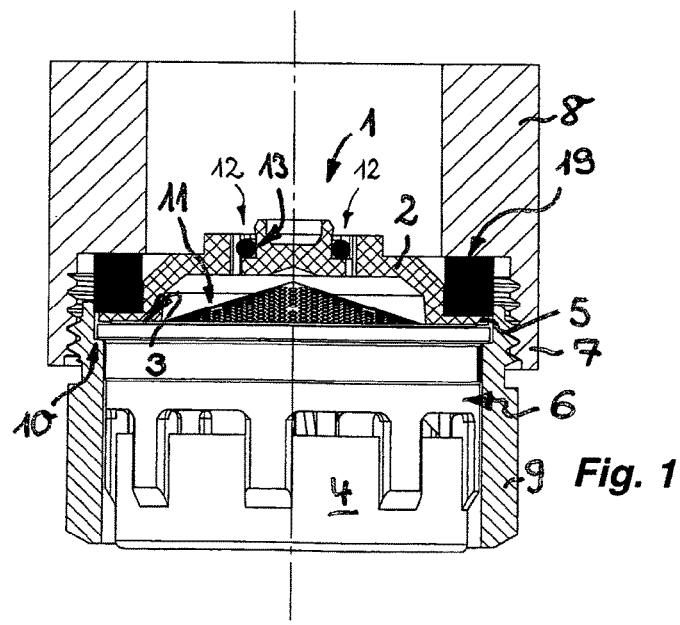

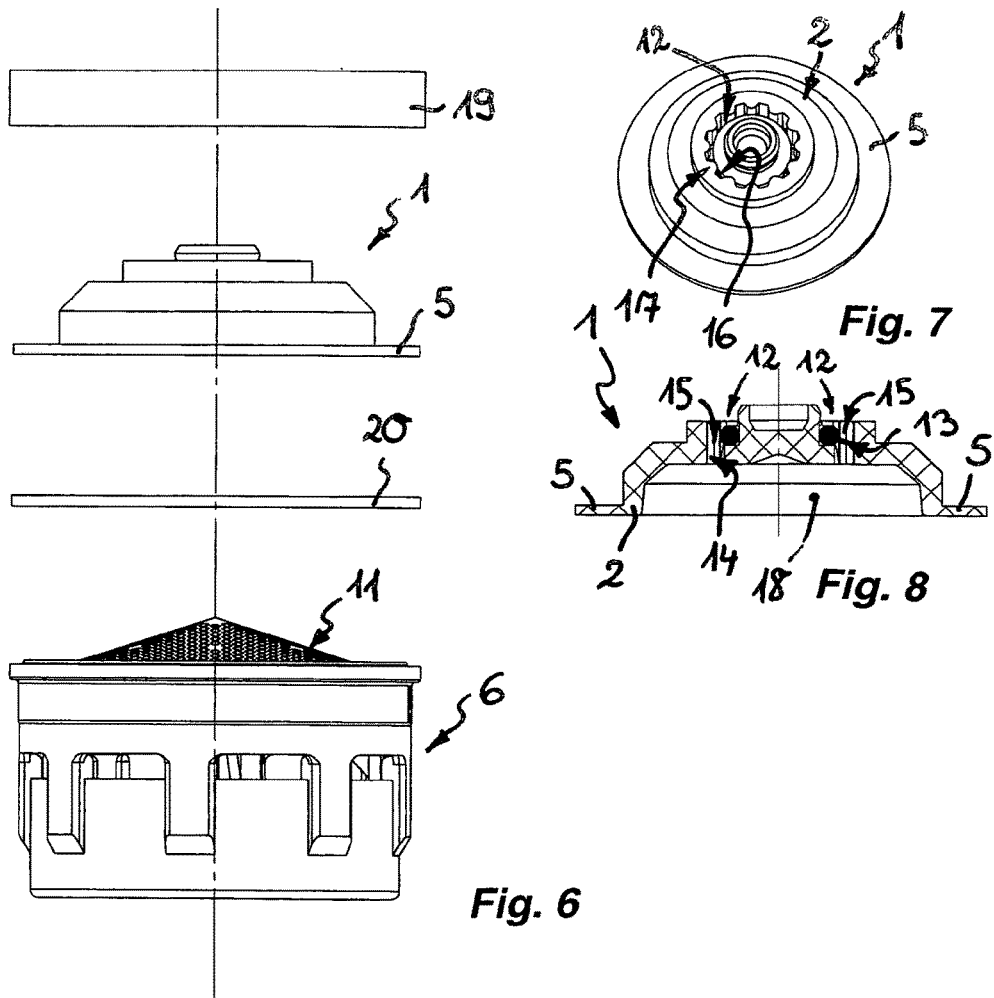
Fig. 7
Fig. 8
Fig. 6
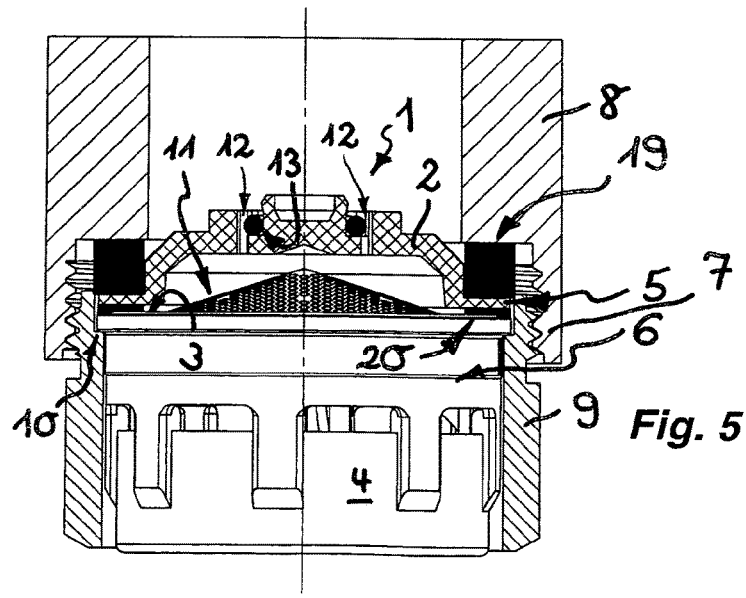
Fig. 5

FLOW RATE REGULATOR

BACKGROUND

The invention concerns a jet regulator with a sieve attachment and a flow regulator, the shell-like regulator housing of which has an outer circumferential edge region which can be placed on the inflow end circumferential edge region of the jet regulator and/or sieve attachment and is designed as a radially outwardly protruding ring flange, which regulator housing has a central ring gap in which can be provided an annular choke body of elastic material which delimits a control gap between itself and an inner and/or outer circumferential wall of the ring gap having a control profiling, wherein the clear flow cross section of the control gap can be modified under the pressure of the flowing water.

Flow regulators are previously known in various embodiments. Such flow regulators, which are designed to even out and limit to a preset value the water quantity flowing out of an outlet fitting per time unit irrespective of any fluctuation in water pressure, normally have a regulator housing with a central ring gap in which is provided an annular choke body of elastic material. This choke body delimits a control gap between itself and an inner and/or outer circumferential wall of the ring gap, wherein the clear flow cross section of the control gap can be modified under the pressure of the flowing water. On the inner and/or outer circumferential wall bordering the control gap is provided a control profiling oriented in the flow direction and formed by wall recesses and protrusions, in which profiling the choke body can be molded to a greater or lesser extent depending on pressure.

Flow regulators have been created which can be connected releasably into a unit with an inflow-side sieve attachment and an outflow-side jet regulator, which unit can be mounted using an outlet mouthpiece on the outlet end of the water outlet of a sanitary fitting (see DE 195 10 734 A1).

Flow regulators are also known which are designed narrow such that they fit below the conical sieve attachment which is releasably connected with the jet regulator. These previously known flow regulators are however adapted in their external form and/or connection possibilities to the outflow-side downstream jet regulator and where applicable to the inflow-side upstream sieve attachment. Previously known flow regulators are not however intended also for subsequent fitting with an arbitrary pre-existing jet regulator.

To limit the water quantity flowing out of the outlet fitting, so-called flow limiters have also been created. These flow limiters are designed disk-like and in the center of the disk have a flow opening which has a clear opening cross section adapted to the desired flow volume per time unit. These static flow limiters however only achieve or maintain the desired flow volume approximately, because with these flow limiters an increased water pressure always leads to a correspondingly increased flow volume.

EP 1 933 217 A1 discloses a unit comprising a jet regulator, a sieve attachment and a flow regulator connected in-between. The flow regulator of the unit previously known has a shell-like regulator housing which has an outer circumferential edge region which can be placed on the inflow end circumferential edge region of a jet regulator and is designed as a radially outwardly protruding ring flange and comprises a central ring gap in which is provided an annular choke body of elastic material which delimits a control gap between itself and an inner and/or outer circumferential wall of the ring gap having a control profiling, wherein the clear flow cross section of the control gap can be modified under the pressure of the flowing water. The regulator housing of the flow regulator here sits with an outflow-side part region on an inflow-side recess of the jet regulator while the inflow-side part region of the regulator housing protrudes over the inflow-side of the jet regulator and on the end facing away from the jet regulator is designed to receive the sieve attachment. The unit previously known from EP 1 933 217 A1 has components matched to each other which are designed such that in each case the outflow-side component fits into the inflow-side component and thus the jet regulator cannot be used without the flow regulator in conjunction with the sieve attachment. As however the inflow-side part region of the flow regulator protrudes far over the inflow-side of the jet regulator, the unit previously known from EP 1 933 217 A1 can only be used in such outlet fittings which have the necessary installation height.

DE 82 08 024 U1 discloses a sleeve-like outlet mouthpiece which can be mounted on the water outlet of a sanitary outlet fitting. A jet regulator is inserted in the sleeve-like interior of the outlet mouthpiece down to an inset stop. In the sleeve interior of the outlet mouth piece is also provided a flow regulator which is arranged on the inflow side of the jet regulator and is held spaced from this by a spacer ring lying on the sleeve inner periphery of the outlet mouthpiece. The spacer ring holds the jet regulator and flow regulator spaced apart such that a bell-like or conical sieve attachment is connected in-between. This prior unit known from DE 82 08 024 U1 also has components matched to each other in their shape, of which one component cannot be used without the other components. Since the components are matched to each other, since the jet regulator and flow regulator are held spaced apart by a spacer ring receiving the sieve attachment and since these components therefore have a comparatively large installation height, a correspondingly long outlet mouthpiece is required.

The task therefore exists of creating a flow regulator of the type cited initially with which a desired flow volume per time unit can be achieved or maintained comparatively precisely, irrespective of the momentary water pressure, and which if required can also be combined and fitted subsequently with the jet regulator already present on the outlet fitting.

SUMMARY

The solution to this task according to the invention consists of the flow regulator of the type cited initially, in particular in that the shell interior of the regulator housing open towards the outflow side is dimensioned to receive a part region of the sieve attachment protruding over the end circumferential edge region of the jet regulator.

The flow regulator according to the invention has a regulator housing formed as a shell. The shell-like regulator housing has an outer circumferential edge region which is designed as a radially outwardly protruding ring flange. The flow regulator according to the invention can be placed with the outer edge region designed as a flat ring flange of its regulator housing on the inflow end circumferential edge region of an adjacent outflow-side jet regulator and/or sieve attachment. The shell interior of the shell-like regulator housing open towards the outflow side is dimensioned such that it can receive a part region of the e.g. cap-like or conical sieve attachment protruding over the end circumferential edge region of the jet regulator. The flow regulator according to the invention can thus also be fitted subsequently in a pre-existing installation in which a jet regulator and an upstream sieve attachment are already fitted and mounted on the outlet end of a sanitary outlet fitting. The flow regulator according to the invention is placed only with its external circumferential edge region designed as a ring flange on the inflow end circumferential edge region of the jet regulator such that the flow regulator covers the inflow side of the jet regulator and the sieve attachment fitted upstream of the jet regulator. The flow regulator according to the invention has a central ring gap in which is provided an annular choke body of elastic material which delimits a control gap between itself and an inner and/or outer circumferential wall of the ring gap, wherein the clear flow cross section of the control gap can be modified under the pressure of the flowing water. On the outer circumferential wall is provided a control profiling in which the elastic choke body can be formed or molded to a greater or lesser extent depending on pressure, such that the clear flow cross section of the control gap changes under the pressure of the flowing water. Using the flow regulator according to the invention therefore a subsequent pressure-compensating upgrade can be made to an existing installation which previously comprised only a non-water-saving jet regulator having an unregulated flow and a sieve attachment. Using the flow regulator according to the invention the water volume flowing per time unit can be controlled and limited to an established value substantially more precisely than would be possible with the previously known flow limiters.

The commercial units consisting of sieve attachment and jet regulator regularly have a ring seal which seals between the outflow end of the outlet fitting and the inflow end circumferential edge region of the jet regulator. As the flow regulator according to the invention now lies on the outer circumferential edge region of the jet regulator, it is advantageous if a ring seal is provided at least on the inflow side of the ring flange which again seals against the outflow end edge of the outlet fitting.

To secure the ring seal against accidental loss at the flow regulator according to the invention, it is suitable if the ring seal surrounds the ring flange on the outer circumferential edge.

If a circumferential seal of the flow regulator firstly against the outflow end edge of the outlet fitting and secondly against the jet regulator downstream in the flow direction is desired or necessary, it can be advantageous if the ring seal has one ring seal part region on the inflow-side face and one on the outflow-side face of the ring flange.

A preferred embodiment according to the invention, which can be produced at low cost, provides that the regulator housing is formed as a multi-component injection molding and that the ring seal surrounding the ring flange on the outer edge side is made of an elastic or elastomer material component.

The compatibility of the flow regulator according to the invention with commercial jet regulators is promoted if the ring gap is arranged approximately coaxial to the housing longitudinal axis of the regulator housing.

A preferred embodiment according to the invention provides that the choke body cooperates with a control profiling provided on the inner circumferential wall bordering the ring gap.

The versatile usability of the flow regulator according to the invention is promoted if the jet regulator can be inserted in a sleeve-like outlet mouthpiece and if the ring seal protrudes over the inflow end circumferential edge region of the outlet mouthpiece.

BRIEF DESCRIPTION OF THE DRAWINGS

Additional embodiments of the invention arise from the claims and the description in conjunction with the drawing.

The invention is now explained with its essential details in more depth below with reference to the drawings. The drawings show:

FIG. 1 a jet regulator with a sieve attachment which is inserted in a sleeve-like outlet mouthpiece which on its outer periphery carries an external thread, with which the outlet mouthpiece can be screwed into an internal thread provided on the outlet end of a sanitary outlet fitting, wherein connected upstream of the jet regulator is a flow regulator shown here in longitudinal section with a shell-like regulator housing, of which the outer circumferential edge region which can be placed on the inlet end circumferential edge region of the jet regulator is formed as a radially outwardly protruding ring flange, and wherein a ring seal lies on the inflow-side face of the ring flange and protrudes over the inflow end circumferential edge region of the outlet mouthpiece, FIG. 2 the jet regulator with sieve attachment, flow regulator and ring seal from FIG. 1 in an exploded view, FIG. 3 the flow regulator from FIGS. 1 and 2 in a perspective view, FIG. 4 the flow regulators from FIGS. 1 to 3 in longitudinal section, FIG. 5 the flow regulators from FIGS. 1 to 4, wherein here in addition a ring seal is provided on the outflow-side face of the ring flange of the flow regulator, FIG. 6 the jet regulator with sieve attachment, the outflow-side ring seal, the flow regulator itself and the ring seal on the inflow side in relation to the flow regulator, in an exploded view, FIG. 7 the flow regulator from FIGS. 5 and 6 in a perspective view, and FIG. 8 the flow regulator from FIGS. 5 to 7 in longitudinal section.

DETAILED DESCRIPTION OF THE PREFERRED EMBODIMENTS

FIGS. 1 to 8 show a flow regulator 1 in two different embodiments. The flow regulator 1 has a regulator housing 2 which has an outer circumferential edge region 5 which can be placed on the inflow end circumferential edge region 3 of a sleeve-like jet regulator housing 4. The jet regulator housing 4 is part of a jet regulator 6 which is here formed as an aerated jet regulator and is intended to form a homogenous, splash-free and soft perlating water jet.

In order to be able to mount the jet regulator 6 releasably on the outlet end 7 of a sanitary outlet fitting 8, a sleeve-like outlet mouthpiece 9 is provided in which the jet regulator 6 can be inserted from the inflow side up to an insert stop designed here as a ring shoulder 10. In an inflow-side housing part region of the jet regulator housing 4 a sieve attachment 11 is releasably attached which is intended to retain any dirt particles carried in the water and which protrudes over the inflow end of the jet regulator 6 only by a central part region of its conical outer contour.

The regulator housing 2 of the flow regulator 1 has a central ring gap 12 in which is provided an annular choke body 13 of elastic material. This choke body 13 delimits a control gap 15 between itself and an outer inner circumferential wall 14, wherein the clear flow cross section of the control gap can be modified under the pressure of the flowing water. On the inner circumferential wall 14 is also provided a control profiling consisting of wall recesses and protrusions 16, 17 oriented in the flow direction, in which the annular elastic choke body 13 can form or mold itself increasingly under increasing pressure such that the clear flow cross section of the control gap 15 reduces ever more as the pressure increases.

The regulator housing 2 of the flow regulator 1 is formed shell-like. The outer circumferential edge region 5 of the shell-like regulator housing 2 is designed as a radially outwardly protruding ring flange. The shell interior 18 of the regulator housing 2 open towards the outflow side is dimensioned such that it can receive the part region of the sieve attachment 11 protruding over the inflow-side face and in particular the end circumferential edge region 3 of the jet regulator 6.

The flow regulator 1 can therefore also be used subsequently in an existing installation in which a jet regulator 6 and an upstream sieve attachment 11 are already present and mounted at the outlet end 7 of a sanitary outlet fitting 8. The flow regulator 1 is placed only with its outer circumferential edge region 5 formed as a ring flange on the inflow end circumferential edge region 3 of the jet regulator 6 such that the flow regulator 1 covers the inflow side of the jet regulator 6 and the sieve attachment 11 connected upstream of the jet regulator 6. Using the flow regulator 1 therefore a subsequent pressure-compensating upgrade is possible of an existing installation which previously comprised only a jet regulator 6 and a sieve attachment 11. Using the flow regulator 1 the water volume flowing per time unit can be set and limited to a fixed value substantially more precisely than would be possible with the previously known flow limiters.

It is clear from a comparison of the embodiments shown firstly in FIGS. 1 to 4 and secondly in FIGS. 5 to 8 that a ring seal 19 is provided at least on the inflow-side face of the ring flange, which seal is intended to prevent undesirable leakage flows past the outer periphery of the jet regulator housing 4. Whereas the embodiment shown in FIGS. 1 to 4 has only one such inflow-side ring seal 19 which lies on the inflow side of the ring flange and protrudes over the inflow end circumferential edge region of the outlet mouthpiece 9, in the embodiment shown in FIGS. 5 to 8 an outlet-side ring seal 20 is also provided which seals between the outlet side of the ring flange and the inflow end circumferential edge region 3 of the jet regulator 6.

A further embodiment not shown here provides that the ring seal surrounds the ring flange on the outer edge side. The ring seal can here have one ring seal part region on the inflow-side face and one on the outflow-side face of the ring flange. With such an embodiment it can be particularly advantageous if the regulator housing is formed as a multi-component injection molding and if the ring seal surrounding the ring flange on the outer edge side is made from an elastic or elastomer material component.

It is evident from FIGS. 1 and 5 that the ring gap 12 is arranged approximately coaxial to the housing longitudinal axis of the regulator housing 2.

The invention claimed is:

1. A combination of a jet regulator (6) with a conical-shaped sieve (11), which is arranged, in a flow direction, upstream of an inflow end of the jet regulator (6); and a flow regulator (1), the flow regulator (1) is arranged upstream of the conical-shaped sieve (11), the flow regulator comprises a housing (2) having a central ring gap (12), defined by an inner circumferential wall and an outer circumferential wall, in which is provided an annular choke body (13) of elastic material, which delimits a control gap (15) between itself and at least one of the inner or outer circumferential wall (14) of the ring gap (12) having a control profiling, a clear flow cross section of the control gap (15) can be modified under pressure of the flowing water, a shell interior (18) of the regulator housing (2) open towards an outflow side, the outflow side of the regulator housing (2) receives a central portion of an upstream protruding part region of the conical-shaped sieve (11).

2. The combination as claimed in claim 1, wherein a ring seal (19) is provided at least on an inflow-side face of the ring flange.

3. The combination as claimed in claim 2, wherein the ring seal (19) surrounds the ring flange on an outer edge side.

4. The combination as claimed in claim 3, wherein the ring seal (19) surrounds the ring flange on the outer edge side such that the ring seal has one ring seal part region provided on the inflow-side face and one on an outflow-side face of the ring flange.

5. The combination as claimed in claim 3, wherein the regulator housing (2) is formed as a multi-component injection molding and the ring seal surrounding the ring flange on the outer edge side is made from an elastic or elastomer material component.

6. The combination as claimed in claim 1, wherein the ring gap (12) is arranged approximately coaxial to a housing longitudinal axis of the regulator housing (2).

7. The combination as claimed in claim 1, wherein the choke body cooperates with the control profiling provided on the inner circumferential wall (14) bordering the ring gap (12).

8. The combination as claimed in claim 2, wherein the jet regulator (6) is insertable in a sleeve-like outlet mouthpiece (9) and the ring seal (19) protrudes over an inflow end circumferential edge region of the outlet mouthpiece (9).

* * * * *